United States Patent
Yamazaki

(10) Patent No.: US 9,136,530 B2
(45) Date of Patent: Sep. 15, 2015

(54) ENERGY STORAGE DEVICE AND MANUFACTURING METHOD THEREOF

(75) Inventor: Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 459 days.

(21) Appl. No.: 13/113,217

(22) Filed: May 23, 2011

(65) Prior Publication Data

US 2011/0289767 A1    Dec. 1, 2011

(30) Foreign Application Priority Data

May 28, 2010  (JP) .................................. 2010-123260

(51) Int. Cl.

| | | |
|---|---|---|
| H01M 4/04 | (2006.01) | |
| H01M 4/1395 | (2010.01) | |
| H01M 4/525 | (2010.01) | |
| H01G 11/24 | (2013.01) | |
| H01M 4/52 | (2010.01) | |
| H01M 4/24 | (2006.01) | |
| H01G 11/28 | (2013.01) | |
| H01G 11/26 | (2013.01) | |
| H01M 4/38 | (2006.01) | |

(52) U.S. Cl.
CPC .......... *H01M 4/1395* (2013.01); *H01M 4/0428* (2013.01); *H01G 11/24* (2013.01); *H01G 11/26* (2013.01); *H01G 11/28* (2013.01); *H01M 4/04* (2013.01); *H01M 4/0404* (2013.01); *H01M 4/242* (2013.01); *H01M 4/386* (2013.01); *H01M 4/52* (2013.01); *H01M 4/521* (2013.01); *H01M 4/523* (2013.01); *H01M 4/525* (2013.01); *Y02E 60/122* (2013.01); *Y10T 29/49108* (2015.01)

(58) Field of Classification Search
None
See application file for complete search history.

(56) References Cited

U.S. PATENT DOCUMENTS

| | | |
|---|---|---|
| 3,796,598 A | 3/1974 | Gejyo et al. |
| 4,155,781 A | 5/1979 | Diepers |
| 5,338,625 A | 8/1994 | Bates et al. |

(Continued)

FOREIGN PATENT DOCUMENTS

| | | |
|---|---|---|
| JP | 55-149199 A | 11/1980 |
| JP | 2001-210315 | 8/2001 |

(Continued)

OTHER PUBLICATIONS

Wagner et al. "Vapor-Liquid-Solid Mechanism of Single Crystal Growth" Appl. Phys. Lett. 4(5), 1964, p. 89-90.*

(Continued)

*Primary Examiner* — Carlos Barcena
*Assistant Examiner* — Wojciech Haske
(74) *Attorney, Agent, or Firm* — Nixon Peabody LLP; Jeffrey L. Costellia

(57) ABSTRACT

An energy storage device whose discharge capacity can be improved and a method for manufacturing the energy storage device are provided. A method for manufacturing an energy storage device, in which a metal element is dispersed over a current collector, and a crystalline silicon layer including a whisker is formed as an active material layer over the surface of the current collector on which the metal element is dispersed by low pressure chemical vapor deposition (LPCVD) in which heating is performed using a deposition gas containing silicon. Having whiskers in the active material layer as described above, the surface area of the active material layer is increased; thus, the discharge capacity of the energy storage device can be increased.

14 Claims, 8 Drawing Sheets

(56) References Cited

U.S. PATENT DOCUMENTS

| | | | |
|---|---|---|---|
| 6,402,796 B1 * | 6/2002 | Johnson | 29/623.5 |
| 6,451,113 B1 | 9/2002 | Givargizov | |
| 6,685,804 B1 | 2/2004 | Ikeda et al. | |
| 6,844,113 B2 | 1/2005 | Yagi et al. | |
| 6,887,511 B1 | 5/2005 | Shima et al. | |
| 7,015,496 B2 | 3/2006 | Ohnuma et al. | |
| 7,192,673 B1 | 3/2007 | Ikeda et al. | |
| 7,235,330 B1 | 6/2007 | Fujimoto et al. | |
| 7,241,533 B1 | 7/2007 | Ikeda et al. | |
| 7,368,306 B2 | 5/2008 | Ohnuma et al. | |
| 7,396,409 B2 | 7/2008 | Hatta et al. | |
| 7,410,728 B1 | 8/2008 | Fujimoto et al. | |
| 7,794,881 B1 | 9/2010 | Fujimoto et al. | |
| 8,257,866 B2 | 9/2012 | Loveness et al. | |
| 8,556,996 B2 | 10/2013 | Loveness et al. | |
| 2002/0168574 A1 | 11/2002 | Ahn et al. | |
| 2005/0244324 A1 | 11/2005 | Hatta et al. | |
| 2006/0216528 A1 | 9/2006 | Lee et al. | |
| 2007/0007239 A1 | 1/2007 | Lee et al. | |
| 2007/0166613 A1 | 7/2007 | Kogetsu et al. | |
| 2007/0186627 A1 * | 8/2007 | Yi et al. | 73/105 |
| 2007/0232028 A1 | 10/2007 | Lee et al. | |
| 2007/0292339 A1 | 12/2007 | Kubomura et al. | |
| 2008/0020281 A1 | 1/2008 | Kogetsu et al. | |
| 2008/0118398 A1 * | 5/2008 | Birch et al. | 422/63 |
| 2008/0261112 A1 | 10/2008 | Nagata et al. | |
| 2009/0042102 A1 | 2/2009 | Cui et al. | |
| 2009/0050204 A1 | 2/2009 | Habib | |
| 2009/0117462 A1 | 5/2009 | Okazaki et al. | |
| 2009/0136847 A1 | 5/2009 | Jeong et al. | |
| 2009/0169996 A1 * | 7/2009 | Zhamu et al. | 429/221 |
| 2009/0197209 A1 | 8/2009 | Penner et al. | |
| 2009/0317726 A1 | 12/2009 | Hirose et al. | |
| 2009/0325365 A1 | 12/2009 | Park et al. | |
| 2010/0086837 A1 | 4/2010 | Asari et al. | |
| 2010/0092856 A1 | 4/2010 | Hirose et al. | |
| 2010/0151322 A1 | 6/2010 | Sato et al. | |
| 2010/0178564 A1 | 7/2010 | Asari et al. | |
| 2010/0209784 A1 | 8/2010 | Yamazaki et al. | |
| 2010/0266898 A1 | 10/2010 | Yamamoto et al. | |
| 2010/0285358 A1 | 11/2010 | Cui et al. | |
| 2011/0151290 A1 | 6/2011 | Cui et al. | |
| 2011/0229761 A1 | 9/2011 | Cui et al. | |
| 2011/0266654 A1 | 11/2011 | Kuriki et al. | |
| 2011/0287318 A1 | 11/2011 | Loveness et al. | |
| 2011/0292564 A1 | 12/2011 | Yamazaki | |
| 2011/0294005 A1 | 12/2011 | Kuriki et al. | |
| 2011/0294011 A1 | 12/2011 | Kuriki et al. | |
| 2011/0300445 A1 | 12/2011 | Murakami et al. | |
| 2011/0305950 A1 | 12/2011 | Kuriki et al. | |
| 2012/0003383 A1 | 1/2012 | Furuno | |
| 2012/0003807 A1 | 1/2012 | Furuno et al. | |
| 2012/0070741 A1 | 3/2012 | Liu et al. | |
| 2012/0183856 A1 | 7/2012 | Cui et al. | |
| 2012/0328962 A1 | 12/2012 | Takeuchi et al. | |
| 2013/0344383 A1 | 12/2013 | Loveness et al. | |

FOREIGN PATENT DOCUMENTS

| | | |
|---|---|---|
| JP | 2002-083594 | 3/2002 |
| JP | 2003-246700 | 9/2003 |
| JP | 2004-224576 | 8/2004 |
| JP | 2004-281317 | 10/2004 |
| JP | 2006-263712 A | 10/2006 |
| JP | 2008-103118 | 5/2008 |
| JP | 2009-134917 | 6/2009 |
| JP | 2010-262752 | 11/2010 |
| JP | 2012-526364 | 10/2012 |
| JP | 2013-521621 | 6/2013 |
| WO | WO-2008/090876 A1 | 7/2008 |
| WO | WO 2009060614 A1 * | 5/2009 |
| WO | WO-2009/125540 A1 | 10/2009 |
| WO | WO-2010/129910 | 11/2010 |
| WO | WO-2011-109477 | 9/2011 |
| WO | WO-2011/119614 | 9/2011 |
| WO | WO-2011/149958 | 12/2011 |
| WO | WO-2012-054767 | 4/2012 |

OTHER PUBLICATIONS

Chang et al. (Materials Chemistry and Physics 83 (2004) 199-203).*
U.S. Appl. No. 13/101,598, filed May 5, 2011 to Shunpei Yamazaki.
Cui et al., "Crystalline-Amorphous Core-Shell Silicon Nanowires for High Capacity and High Current Battery Electrodes", Nano Letters, 2009, vol. 9, No. 1, pp. 491-495.
Kamins et al., "Ti-catalyzed Si nanowires by chemical vapor deposition: Microscopy and growth mechanisms", Journal of Applied Physics, vol. 89, No. 2, Jan. 15, 2001, pp. 1008-1016.
Kohno et al., "Silicon Nanoneedles Grown by a Simple Thermal Treatment Using Metal-Sulfur Catalysts". Japanese Journal of Applied Physics, vol. 41, Part 1, No. 2A, Feb. 2002, pp. 577-578.
Jung et al., "Amorphous silicon thin-film negative electrode prepared by low pressure chemical vapor deposition for lithium-ion batteries,", Solid State Communications, Feb. 1, 2003, vol. 125, No. 7-8, pp. 387-390.
Gangloff.L et al., "Self-Aligned, Gated Arrays of Individual Nanotube and Nanowire Emitters", Nano Letters, Jul. 29, 2004, vol. 4, No. 9, pp. 1575-1579.
Leu.I et al., "Chemical Vapor Deposition of Silicon Carbide Whiskers Activated by Elemental Nickel", J. Electrochem. Soc. (Journal of the Electrochemical Society), 1999, vol. 146, No. 1, pp. 184-188.
Pedraza.A et al., "Silicon microcolumn arrays grown by nanosecond pulsed-excimer laser irradiation", Appl. Phys. Lett. (Applied Physics Letters), Apr. 19, 1999, vol. 74, No. 16, pp. 2322-2324.
Felter.T et al., "Cathodoluminescent Field Emission Flat Panel Display Prototype Built Using Arrays of Diamond-Coated Silicon Tips", SID Digest '98 : SID International Symposium Digest of Technical Papers, May 1, 1998, vol. 29, pp. 577-581.
Albuschies.J et al., "High-Density Silicon Nanowire Growth From Self-Assembled Au Nanoparticles", Microelectronic Engineering, Feb. 20, 2006, vol. 83, pp. 1530-1533, Elsevier.
Chan.C et al., "High-performance lithium battery anodes using silicon nanowires", Nature Nanotechnology, Dec. 16, 2007, vol. 3, pp. 31-35.

* cited by examiner

ENERGY STORAGE DEVICE AND MANUFACTURING METHOD THEREOF

BACKGROUND OF THE INVENTION

1. Field of the Invention

The present invention relates to an energy storage device (a power storage device) and a manufacturing method thereof.

Note that the energy storage device indicates all elements and devices which have a function of storing energy.

2. Description of the Related Art

In recent years, energy storage devices such as lithium-ion secondary batteries, lithium-ion capacitors, and air cells have been developed.

The electrode of an energy storage device is formed by forming an active material over a surface of a current collector. As the active material, a material which can store and release ions functioning as carriers, such as carbon or silicon, is used. Specifically, silicon or phosphorus-doped silicon has higher theoretical capacity than carbon; thus, it is preferable to use the material as an active material in terms of increased capacity of the energy storage device (e.g., Patent Document 1).

REFERENCE

[Patent Document 1] Japanese Published Patent Application No. 2001-210315

SUMMARY OF THE INVENTION

However, even when silicon is used as a negative electrode active material, it is difficult to obtain a discharge capacity as high as the theoretical capacity in practice.

In view of the above, an object of one embodiment of the present invention is to provide an energy storage device whose discharge capacity can be improved and a method for manufacturing the energy storage device.

One embodiment of the present invention is a method for manufacturing an energy storage device, in which a metal element is dispersed over a current collector, and a crystalline silicon layer including a whisker is formed as an active material layer over the surface of the current collector on which the metal element is dispersed by low pressure chemical vapor deposition (LPCVD) in which heating is performed using a deposition gas containing silicon.

In the above, low pressure chemical vapor deposition is preferably performed at a temperature which is higher than 580° C. Further, as the deposition gas containing silicon, silicon hydride, silicon fluoride, or silicon chloride is preferably used.

In the above, the current collector is formed over a substrate by sputtering or chemical vapor deposition (CVD). Further, the current collector preferably has a foil shape, a plate shape, or a net shape.

In the above, the dispersion of the metal element is preferably performed by application of a chemical solution containing a metal element at 1000 ppm or more. The metal element is an element which forms silicide; for example, one or more selected from zirconium, titanium, hafnium, vanadium, niobium, tantalum, chromium, molybdenum, tungsten, cobalt, and nickel can be employed.

According to one embodiment of the present invention, an energy storage device having a high discharge capacity can be manufactured.

DETAILED DESCRIPTION OF THE INVENTION

Figure 1A:
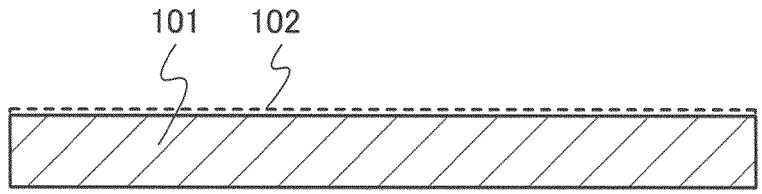
FIGS. 1A to 1D are cross-sectional views illustrating a method for manufacturing a negative electrode of an energy storage device.

Hereinafter, embodiments of the present invention will be described with reference to the drawings. Note that the invention is not limited to the following description, and it will be easily understood by those skilled in the art that various changes and modifications can be made without departing from the spirit and scope of the invention. Thus, the present invention should not be interpreted as being limited to the following description of the embodiments. In description with reference to the drawings, in some cases, the same reference numerals are used in common for the same portions in different drawings. Further, in some cases, the same hatching patterns are applied to similar parts, and the similar parts are not necessarily designated by reference numerals.

(Embodiment 1)

In this embodiment, an electrode of an energy storage device which is one embodiment of the present invention and a manufacturing method thereof will be described with reference to FIGS. 1A to 1D and FIG. 2.

As illustrated in FIG. 1A, over a current collector 101, a metal element is dispersed by a coating method typified by spin coating, whereby a region 102 in which the metal element is dispersed is formed.

The current collector 101 functions as a current collector of an electrode. Thus, the current collector 101 is formed using a conductive material having a foil shape, a plate shape, or a net shape. For example, the current collector 101 can be formed using a metal element with high conductivity typified by platinum, aluminum, copper, or titanium. Alternatively, the current collector 101 may be formed using an aluminum alloy to which an element which improves heat resistance, such as silicon, titanium, neodymium, scandium, or molybdenum, is added. Further alternatively, a silicon wafer may be used as the current collector 101. Furthermore, the current collector 101 may be formed using a metal element which forms silicide. Examples of the metal element which forms silicide include zirconium, titanium, hafnium, vanadium, niobium, tantalum, chromium, molybdenum, tungsten, cobalt, nickel, and the like. The current collector 101 can be formed by sputtering or chemical vapor deposition (CVD).

The region 102 in which the metal element is dispersed has a function of controlling crystallinity of an active material layer 103. For example, the region 102 can be a layer in which a metal element which improves the crystallinity of the active material layer 103 is dispersed. The metal element can be dispersed by dip coating, spin coating, a droplet discharge method, plasma spraying, a printing method such as screen printing and offset printing, and the like. The region 102 in which the metal element is dispersed is preferably formed by a coating method typified by spin coating in order to disperse the metal element appropriately in the region 102. At that time, the concentration of the metal element in a chemical solution to be used is desirably greater than or equal to 1000 ppm. This is because the number density of whiskers included in the active material layer 103 can be increased by increasing the concentration of the metal element in the chemical solution. The metal element is not particularly limited as long as it functions as a catalyst which improves the crystallinity of the active material layer 103. In the case where the active material layer 103 is a crystalline silicon layer, an element which forms silicide, for example, one or more selected from zirconium, titanium, hafnium, vanadium, niobium, tantalum, chromium, molybdenum, tungsten, cobalt, nickel, and the like can be used.

Figure 1B:
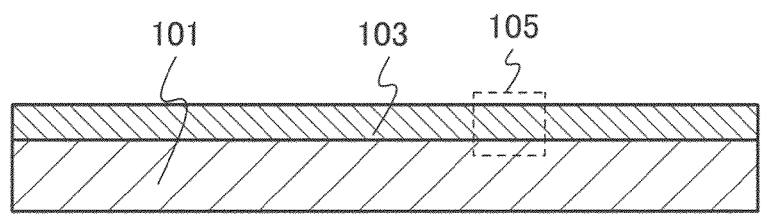

Next, over the region 102 in which the metal element is dispersed, a crystalline silicon layer is formed as the active material layer 103 by chemical vapor deposition (CVD), preferably by low pressure chemical vapor deposition (LPCVD) (see FIG. 1B). The metal element in the region 102 in which the metal element is dispersed, is dispersed in the crystalline silicon layer when the crystalline silicon layer is formed. Therefore, the most part of the region 102 in which the metal element is dispersed is lost after the crystalline silicon layer is formed. Thus, in FIGS. 1B to 1D, the region 102 in which the metal element is dispersed is not illustrated.

The active material layer 103 is a crystalline silicon layer. The crystalline silicon layer can be formed by LPCVD, for example. The crystalline silicon layer can be formed using a deposition gas containing silicon as a source gas while heating is performed at a temperature higher than 580° C. and lower than or equal to the temperature at which an LPCVD apparatus or the current collector 101 can withstand, preferably a temperature higher than or equal to 600° C. and lower than 650° C. As the deposition gas containing silicon, silicon hydride, silicon fluoride, silicon chloride, and the like are given; typically, $SiH_4$, $Si_2H_6$, $SiF_4$, $SiCl_4$, $Si_2Cl_6$, and the like are given. Note that a rare gas such as helium, neon, argon, and xenon and hydrogen may be mixed in the source gas.

Note that oxygen or the like from a chamber of the LPCVD apparatus is contained as an impurity in the active material layer 103 in some cases.

Note that impurity elements imparting one conductivity type, such as phosphorus or boron, may be added to the crystalline silicon layer. A crystalline silicon layer to which the impurity elements imparting one conductivity type, such as phosphorus or boron, are added has higher conductivity, so that electric conductivity of the electrode can be increased. Therefore, a discharge capacity can be further increased.

When heat treatment for crystallization of silicon is performed after silicon is formed as the active material layer 103 over the current collector 101 made of a metal such as titanium, a low-density region is formed between the current collector 101 and the active material layer 103 in some cases. Therefore, conductivity between the current collector 101 and the active material layer 103 is reduced and the current collector 101 and the active material layer 103 are easily separated. On the other hand, when the crystalline silicon layer is formed by LPCVD as the active material layer 103, the low-density region is not formed between the current collector 101 and the active material layer 103; accordingly, electrons transfer easily at the interface between the current collector 101 and the active material layer 103, and adhesion between the current collector 101 and the active material layer 103 can be increased. One of the reasons is that active species of the source gas are supplied continuously to the crystalline silicon layer that is being deposited in a step of forming the crystalline silicon layer, so that silicon diffuses into the current collector 101 from the crystalline silicon layer. Even if a region (a sparse region) which lacks silicon is formed, the active species of the source gas are continuously supplied to the region; therefore, a low-density region is unlikely to be formed in the crystalline silicon layer. In addition, because the crystalline silicon layer is formed over the current collector 101 by vapor-phase growth, productivity of the energy storage device can be increased.

Figure 1C:
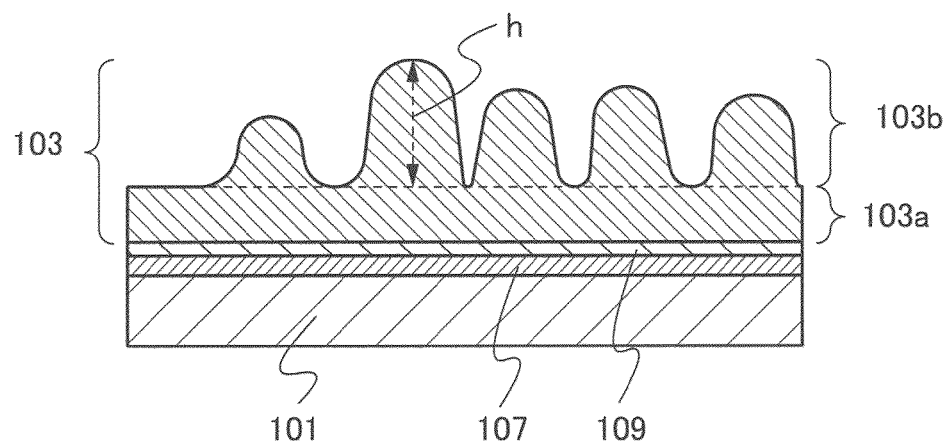

Here, an enlarged view of the current collector 101 and the active material layer 103 surrounded by a dashed line 105 is illustrated in FIG. 1C.

As illustrated in FIG. 1C, a mixed layer 107 is formed between the current collector 101 and the active material layer 103 in some cases. In that case, the mixed layer 107 may be formed using silicon and a metal element contained in the current collector 101. Silicon is diffused into the current collector 101 by heating during the formation of the crystalline silicon layer as the active material layer 103 by LPCVD, whereby the mixed layer 107 is formed.

When the current collector 101 is formed using a metal element which forms silicide, the mixed layer 107 is formed using silicide of the metal element; typically, one or more of zirconium silicide, titanium silicide, hafnium silicide, vanadium silicide, niobium silicide, tantalum silicide, chromium silicide, molybdenum silicide, tungsten silicide, cobalt silicide, and nickel silicide, is/are formed. Alternatively, an alloy layer of silicon and a metal element is formed.

Note that oxygen or the like from a chamber of the LPCVD apparatus is contained as an impurity in the mixed layer 107 in some cases.

With the mixed layer 107 between the current collector 101 and the active material layer 103, resistance between the current collector 101 and the active material layer 103 can be reduced; thus, the electric conductivity of the electrode can be increased. Therefore, the discharge capacity can be further increased. In addition, the adhesion between the current collector 101 and the active material layer 103 can be increased, so that deterioration of the energy storage device can be suppressed.

Over the mixed layer 107, a metal oxide layer 109 containing an oxide of the metal element included in the current collector 101 is formed in some cases. Note that when the crystalline silicon layer is formed by LPCVD, by filling the chamber with a rare gas such as helium, neon, argon, or xenon, the formation of the metal oxide layer 109 can also be suppressed.

When the current collector 101 is formed using a metal element which forms silicide, a metal oxide is formed. Typical examples of the metal oxide are zirconium oxide, titanium oxide, hafnium oxide, vanadium oxide, niobium oxide, tantalum oxide, chromium oxide, molybdenum oxide, tungsten oxide, cobalt oxide, nickel oxide, and the like. Note that when the current collector 101 is a region in which a metal element such as titanium, zirconium, niobium, or tungsten is dispersed, the metal oxide layer 109 includes an oxide conductor such as titanium oxide, zirconium oxide, niobium oxide, or tungsten oxide; thus, resistance between the current collector 101 and the active material layer 103 can be reduced and the electric conductivity of the electrode can be increased. Therefore, the discharge capacity can be further increased.

The active material layer 103 includes a crystalline silicon region 103a and a crystalline silicon region 103b including a whisker formed over the crystalline silicon region 103a. Note that the boundary between the crystalline silicon region 103a and the crystalline silicon region 103b including a whisker is not clear. Therefore, a plane that is in the same level as the bottom of valleys formed between whiskers is regarded as the tentative boundary between the crystalline silicon region 103a and the crystalline silicon region 103b including a whisker.

The crystalline silicon region 103a is formed to cover the current collector 101. The whisker in the crystalline silicon region 103b may have a columnar shape such as a cylinder shape or a prism shape, or a needle shape such as a cone shape or a pyramid shape as long as it is a crystalline protrusion. Note that the top of the whisker may be curved. A width of the whisker is greater than or equal to 50 nm and less than or equal to 10 preferably greater than or equal to 500 nm and less than or equal to 3 µm. In addition, a length of the whisker is greater than or equal to 0.5 µm and less than or equal to 1000 µm, preferably greater than or equal to 1 µm and less than or equal to 100

Here, the length of the whisker refers to the size in a growth direction (long-side direction) of the whisker. Given that the whisker has a columnar shape, the length of the whisker means a distance between the top surface and the bottom surface of the whisker. Given that the whisker has a needle shape, the length of the whisker means a distance between the apex and the bottom surface of the whisker. In addition, the thickness of the crystalline silicon layer including a whisker is the sum of the thickness of the crystalline silicon region 103a and the thickness of the crystalline silicon region 103b including a whisker. Further, the thickness of the crystalline silicon region 103b including a whisker means the distance from a maximum height point of the whisker to the boundary between the crystalline silicon region 103a and the crystalline silicon region 103b including a whisker.

Note that, in some cases, the growth direction of the whisker (the direction in which a whisker extends from the crystalline silicon region 103a) is referred to as a long-side direction and a cross-sectional shape along the long-side direction is referred to as a long-side cross-sectional shape. In addition, the shape of a cross section in which the long-side direction is a normal direction is referred to as a sliced cross-sectional shape in some cases.

As illustrated in FIG. 1C, the long-side direction of the whisker may be one direction, e.g., the normal direction to the surface of the crystalline silicon region 103a. Note that the long-side direction of the whisker may be substantially the same as the normal direction to the surface of the crystalline silicon region 103a. In other words, the whisker having the long-side cross-sectional shape of the whisker is mainly illustrated in FIG. 1C.

Figure 1D:
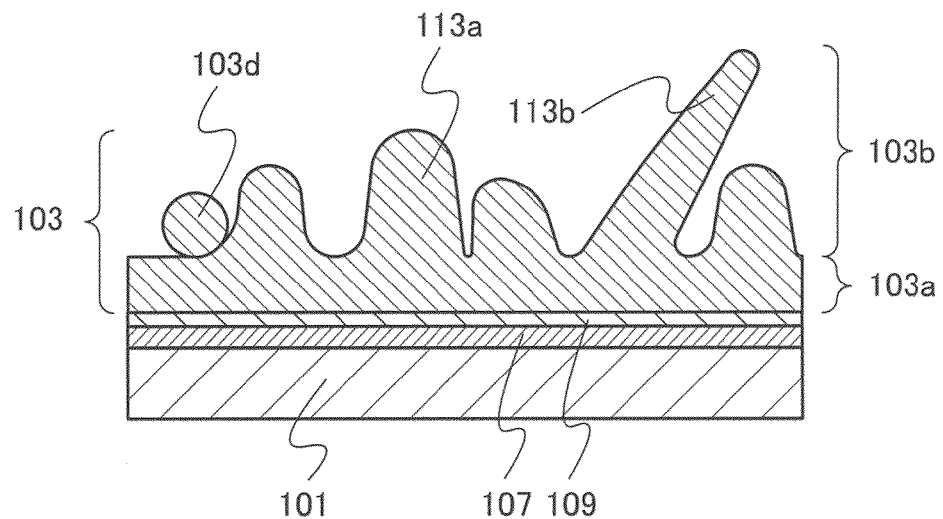

Alternatively, as illustrated in FIG. 1D, the long-side directions of the whiskers formed may be uneven. Typically, the crystalline silicon region 103b including a whisker may include a first whisker 113a whose long-side direction is substantially the same as the normal direction and a second whisker 113b whose long-side direction is different from the normal direction. Further, the length of the second whisker 113b may be greater than that of the first whisker 113a. In addition, FIG. 1D illustrates, a whisker having a sliced cross-sectional shape like a region 103d, in addition to the whiskers having long-side cross-sectional shapes. The region 103d is circular because it is the sliced cross-sectional shape of a whisker having a cylinder or cone shape. However, when the whisker has a prism or pyramid shape, the region 103d is polygonal. When the long-side directions of the whiskers are random, the whiskers are tangled with each other in some cases; therefore, the whiskers are unlikely to be peeled off in charge and discharge of the energy storage device.

The electrode of the energy storage device of this embodiment includes as an active material layer a crystalline silicon layer in which the growth of whiskers is controlled by a coating method typified by spin coating. Having the whiskers in the active material layer as described above, the surface area of the active material layer is increased; thus, the discharge capacity of the energy storage device is increased. Specifically, when the coating method such as spin coating is used for controlling the growth of the whiskers, the number density of whiskers included in the active material layer can be easily increased, thereby offering the advantage that the discharge capacity is easily increased.

The electrode of the energy storage device of this embodiment includes at least the mixed layer 107 between the current collector 101 and the active material layer 103 (crystalline silicon layer). Thus, resistance due to the interface between the current collector 101 and the active material layer 103 can be reduced, and adhesion between the current collector 101 and the active material layer 103 can be increased; therefore, the discharge capacity can be increased and the deterioration of the energy storage device can be suppressed.

Figure 2:
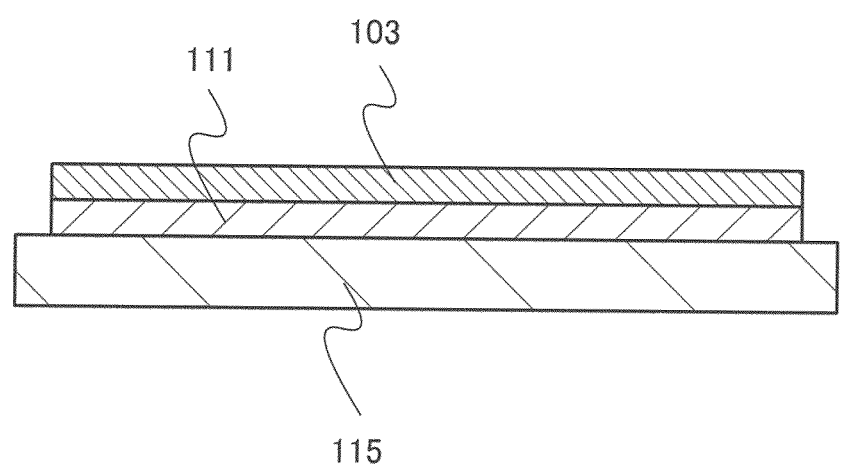
FIG. 2 is a cross-sectional view illustrating a method for manufacturing a negative electrode of an energy storage device.

Note that FIGS. 1A to 1D illustrate the case where the current collector 101 is formed using a conductive material having a foil shape, a plate shape, or a net shape; however, as illustrated in FIG. 2, a current collector 111 can be formed by sputtering, vapor deposition, a printing method, an inkjet method, CVD, or the like as appropriate over a substrate 115.

Through the above process, the electrode of the energy storage device having a high discharge capacity can be manufactured.

EXAMPLE

In this example, the growth of silicon whiskers when a silicon layer is formed by LPCVD over the region in which a metal element is dispersed is described.

The description of samples used in this example is made. A chemical solution including a metal element (nickel acetate) was applied to a glass substrate, whereby the metal element was dispersed. At that time, as the concentration of nickel acetate, two conditions of 100 ppm and 1000 ppm were adopted.

Then, a crystalline silicon layer was formed by LPCVD over the region in which the metal element was dispersed. The film formation of a crystalline silicon layer by LPCVD was performed as follows: silane was introduced as a source gas into a reaction chamber with a flow rate of 300 sccm, the pressure of the reaction chamber was 20 Pa, and the temperature of the reaction chamber was 600° C. Further, the deposition time was 2 hours and 15 minutes.

Figure 8A:
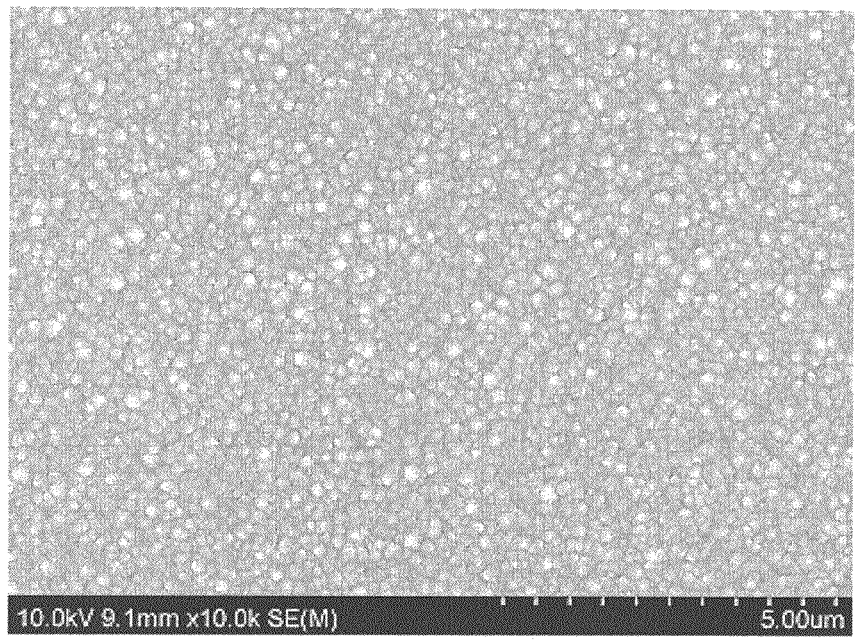
FIGS. 8A and 8B are SEM images of a crystalline silicon layer.
Figure 8B:
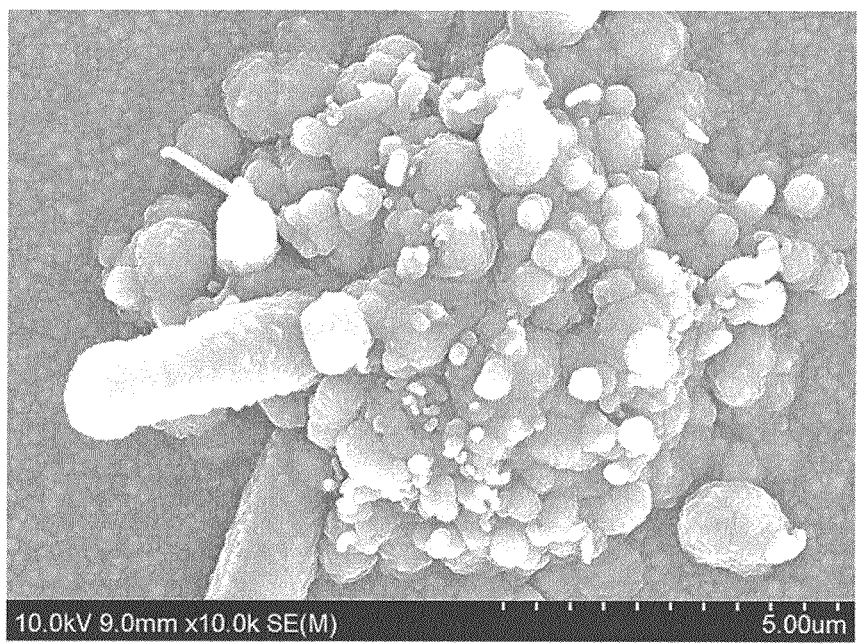

FIGS. 8A and 8B show scanning-electron-microscope (SEM) images of the formed crystalline silicon layer. FIG. 8A is a SEM image in which the concentration of nickel acetate is 100 ppm and FIG. 8B is a SEM image in which the concentration of nickel acetate is 1000 ppm.

In the crystalline silicon layer shown in FIG. 8A, minute grains with a 0.1 µm to 0.3 µm diameter were formed as a crystalline silicon region and whiskers were not formed. On the other hand, in the crystalline silicon layer shown in FIG. 8B, minute grains with a 0.1 µm to 0.3 µm diameter were formed as a crystalline silicon region and whiskers were formed in the crystalline silicon region.

The results showed that the whiskers were able to be grown in the crystalline silicon region by forming the crystalline silicon layer over the region in which a metal element whose concentration was 1000 ppm or more was dispersed.

In this embodiment, a glass substrate was used as a member to be formed of a crystalline silicon layer. The generation of whiskers can be controlled in the case where a current collector is used as the member to be formed of the crystalline silicon layer.

As described above, according to this embodiment, an electrode of an energy storage device having a high discharge capacity can be achieved. This embodiment can be implemented in combination with any of the other embodiments.

(Embodiment 2)

In this embodiment, a structure of an energy storage device will be described with reference to FIGS. 3A and 3B.

First, a structure of a secondary battery that is one example of an energy storage device is described. Among secondary batteries, a lithium ion battery formed using a lithium-containing metal oxide such as $LiCoO_2$ has a high capacity and high safety. Here, the structure of the lithium ion battery that is a typical example of a secondary battery is described.

Figure 3A:
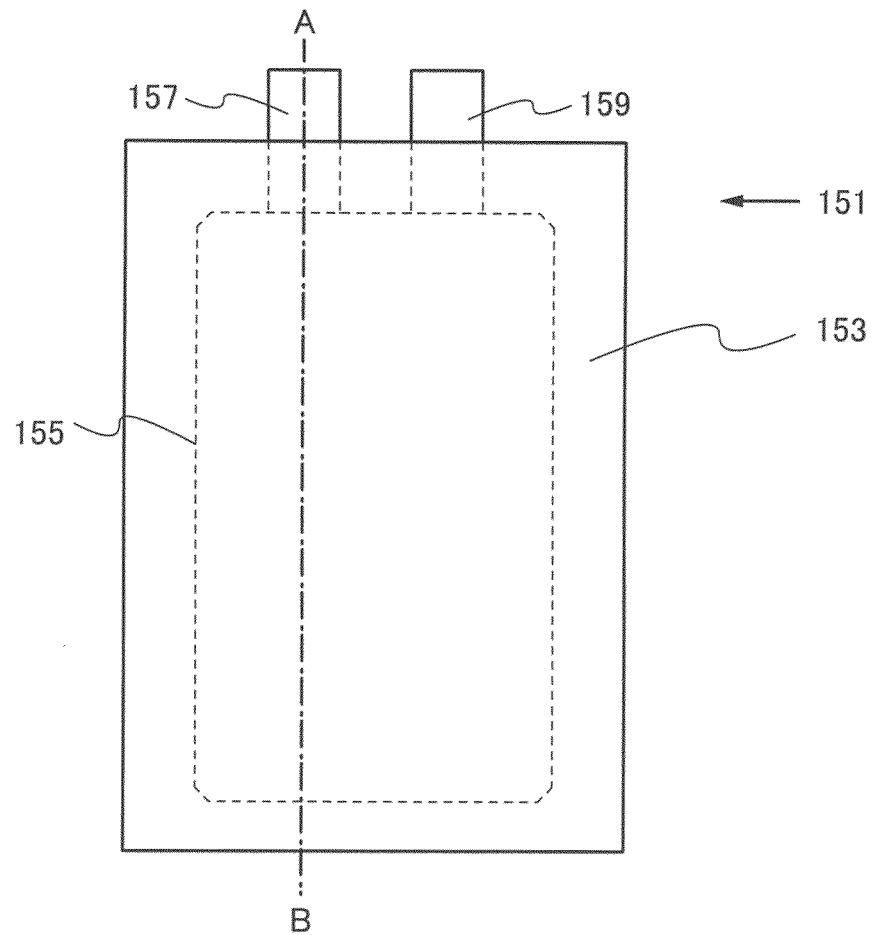
FIGS. 3A and 3B are a plan view and a cross-sectional view illustrating one embodiment of an energy storage device.
Figure 3B:
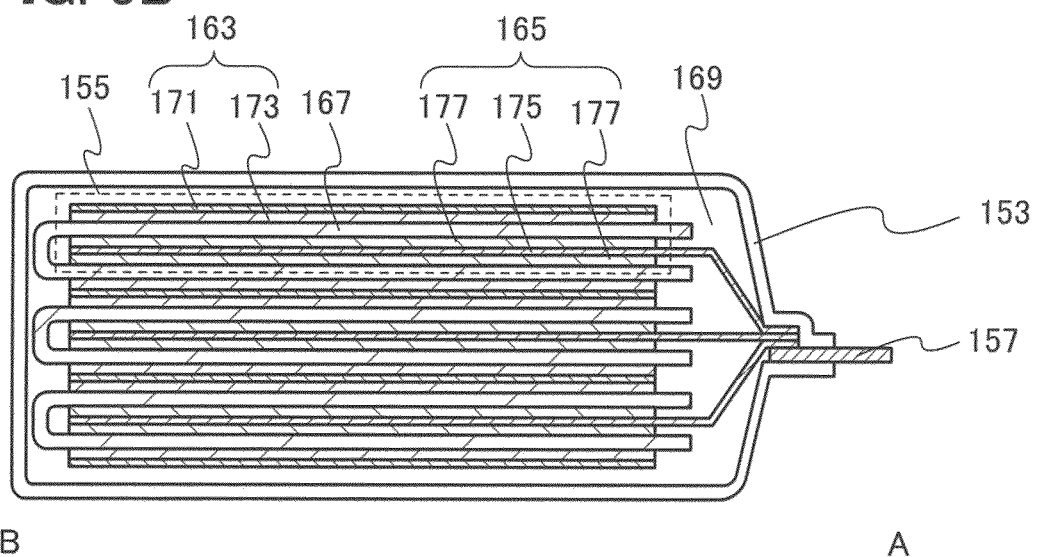

FIG. 3A is a plan view of an energy storage device 151, and FIG. 3B is a cross-sectional view taken along dot-dashed line A-B in FIG. 3A.

The energy storage device 151 illustrated in FIG. 3A includes an energy storage cell 155 in an exterior member 153. The energy storage device 151 further includes terminal portions 157 and 159 which are connected to the storage cell 155. For the exterior member 153, a laminate film, a polymer film, a metal film, a metal case, a plastic case, or the like can be used.

As illustrated in FIG. 3B, the energy storage cell 155 includes a negative electrode 163, a positive electrode 165, a separator 167 between the negative electrode 163 and the positive electrode 165, and an electrolyte 169 filling the exterior member 153.

The negative electrode 163 includes a negative electrode current collector 171 and a negative electrode active material layer 173. The positive electrode 165 includes a positive electrode current collector 175 and a positive electrode active material layer 177. The negative electrode active material layer 173 is formed over one surface or two facing surfaces of the negative electrode collector 171. The positive electrode active material layer 177 is formed over one surface or two facing surfaces of the positive electrode current collector 175.

The negative electrode current collector 171 is connected to the terminal portion 159. The positive electrode collector 175 is connected to the terminal portion 157. Further, the terminal portions 157 and 159 each partly extend outside the exterior member 153.

Note that although a sealed thin energy storage device is described as the energy storage device 151 in this embodiment, an energy storage device can have a variety of structures; for example, a button storage device, a cylindrical energy storage device, or a rectangular energy storage device can be achieved. Further, although the structure where the positive electrode, the negative electrode, and the separator are stacked is described in this embodiment, a structure where the positive electrode, the negative electrode, and the separator are rolled may be employed.

The negative electrode current collector 171 can be formed using the current collector 101 or 111 described in Embodiment 1.

The negative electrode active material layer 173 can be formed using the active material layer 103 formed using the crystalline silicon layer described in Embodiment 1. Note that the crystalline silicon layer may be doped with lithium. In addition, by forming the active material layer 103, which is formed using the crystalline silicon layer, with the negative electrode current collector 171 held by a frame-like susceptor in an LPCVD apparatus, the active material layer 103 can be formed on both of the surfaces of the negative electrode current collector 171 at the same time; therefore, the number of steps can be reduced.

Aluminum, stainless steel, or the like is used for the positive electrode current collector 175. The positive electrode current collector 175 can have a foil shape, a plate shape, a net shape, or the like as appropriate.

The positive electrode active material layer 177 can be formed using $LiFeO_2$, $LiCoO_2$, $LiNiO_2$, $LiMn_2O_4$, $LiFePO_4$, $LiCoPO_4$, $LiNiPO_4$, $LiMn_2PO_4$, $V_2O_5$, $Cr_2O_5$, $MnO_2$, or other lithium compounds as a material. Note when carrier ions are alkali metal ions other than lithium ions, alkaline earth metal ions, beryllium ions, or magnesium ions, the positive electrode active material layer 177 can be formed using, instead of lithium in the above lithium compounds, an alkali metal (e.g., sodium or potassium), an alkaline earth metal (e.g., calcium, strontium, or barium), beryllium, magnesium, or the like.

As a solute of the electrolyte 169, a material in which lithium ions, i.e., carrier ions, can transfer and stably exist is used. Typical examples of the solute of the electrolyte 169 include lithium salt such as $LiClO_4$, $LiAsF_6$, $LiBF_4$, $LiPF_6$, and $Li(C_2F_5SO_2)_2N$. Note that when carrier ions are alkali metal ions other than lithium ions, alkaline earth metal ions, beryllium ions, or magnesium ions, the solute of the electrolyte 169 can be formed using alkali metal salt such as sodium salt or potassium salt, alkaline earth metal salt such as calcium salt, strontium salt, or barium salt, beryllium salt, magnesium salt, or the like, as appropriate.

As the solvent of the electrolyte 169, a material in which lithium ions, i.e., carrier ions, can transfer is used. As the solvent of the electrolyte 169, an aprotic organic solvent is preferably used. Typical examples of aprotic organic solvents include ethylene carbonate, propylene carbonate, dimethyl carbonate, diethyl carbonate, γ-butyrolactone, acetonitrile, dimethoxyethane, tetrahydrofuran, and the like, and one or more of these materials can be used. When a gelled polymer is used as the solvent of the electrolyte 169, safety against liquid leakage or the like is increased. In addition, the energy storage device 151 can be thin and lightweight. Typical examples of gelled polymers include a silicon gel, an acrylic gel, an acrylonitrile gel, polyethylene oxide, polypropylene oxide, a fluorine-based polymer, and the like.

As the electrolyte 169, a solid electrolyte such as $Li_3PO_4$ can be used.

An insulating porous material is used for the separator 167. Typical examples of the separator 167 include cellulose (paper), polyethylene, polypropylene, and the like.

The lithium ion battery has a small memory effect, high energy density, and a high discharge capacity. In addition, the driving voltage of a lithium ion battery is high. Thus, the size and weight of the lithium ion battery can be reduced. Further, the lithium ion battery does not easily degrade due to repetitive charge and discharge and can be used for a long time, so that cost can be reduced.

Next, the structure of a capacitor that is another example of an energy storage device is described. Typical examples of the capacitor include a double-layer capacitor, a lithium ion capacitor, and the like.

In the case of a capacitor, instead of the positive electrode active material layer 177 in the secondary battery in FIG. 3B, a material capable of reversibly absorbing lithium ions and/or anions is preferably used. Typically, the positive electrode active material layer 177 can be formed using active carbon, a conductive polymer, or a polyacene organic semiconductor (PAS).

The lithium ion capacitor has high efficiency of charge and discharge, capability of rapidly performing charge and discharge, and a long life even when it is repeatedly used.

By using the electrode including the current collector and the active material layer described in Embodiment 1 as the negative electrode also in the capacitor, an energy storage device having a high discharge capacity can be manufactured.

Note that the energy storage device using the electrode that is one embodiment of the disclosed invention is not limited to the one described above. For example, the electrode including the current collector and the active material layer which are described in Embodiment 1 can be used as a negative electrode of an air cell which is another embodiment of the energy storage device. In that case, an energy storage device having a higher discharge capacity can also be manufactured.

This embodiment can be implemented in combination with any of the other embodiments.

(Embodiment 3)

Figure 4:
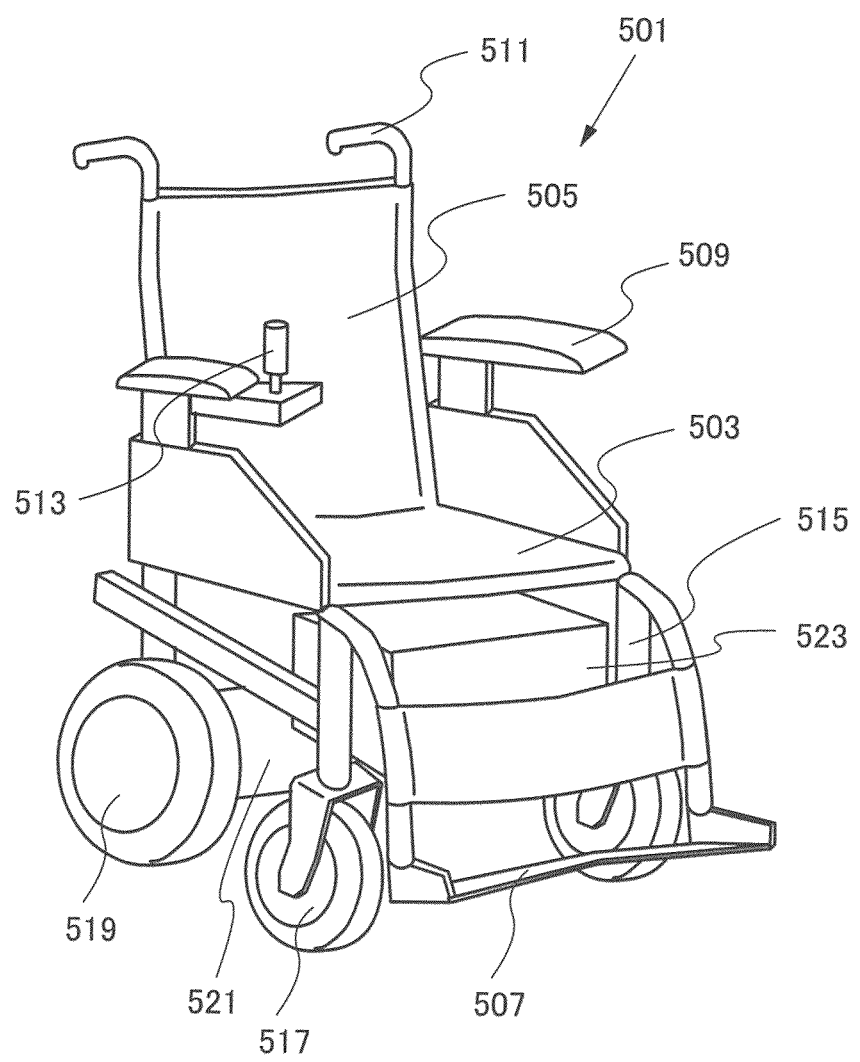
FIG. 4 is a perspective view illustrating an application example of an energy storage device.

In this embodiment, an application example of the energy storage device described in Embodiment 2 will be described with reference to FIG. 4.

The energy storage device described in Embodiment 2 can be used in electronic devices, e.g., cameras such as digital cameras or video cameras, digital photo frames, mobile phones (also referred to as cellular phones or cellular phone devices), portable game machines, portable information terminals, or audio reproducing devices. Further, the energy storage device can be used in electric propulsion vehicles such as electric vehicles, hybrid vehicles, train vehicles, maintenance vehicles, carts, or wheelchairs. Here, as a typical example of the electric propulsion vehicles, a wheelchair is described.

FIG. 4A is a perspective view of an electric wheelchair 501. The electric wheelchair 501 includes a seat 503 where a user sits down, a backrest 505 provided behind the seat 503, a footrest 507 provided at the front of and below the seat 503, armrests 509 provided on the left and right of the seat 503, and a handle 511 provided above and behind the backrest 505. A controller 513 for controlling the operation of the wheelchair is provided for one of the armrests 509. A pair of front wheels 517 is provided at the front of and below the seat 503 through a frame 515 provided below the seat 503, and a pair of rear wheels 519 is provided behind and below the seat 503. The rear wheels 519 are connected to a driving portion 521 having a motor, a brake, a gear, and the like. A control portion 523 including a battery, a power controller, a control means, and the like is provided under the seat 503. The control portion 523 is connected to the controller 513 and the driving portion 521. The driving portion 521 drives through the control portion 523 with the operation of the controller 513 by the user and the control portion 521 controls the operation of moving forward, moving back, turning around, and the like, and the speed.

The energy storage device described in Embodiment 2 can be used in the power of the control portion 523. The power of the control portion 523 can be externally charged by electric power supply using plug-in systems or contactless power feeding. Note that in the case where the electric propulsion vehicle is a train vehicle, the train vehicle can be charged by electric power supply from an overhead cable or a conductor rail.

This embodiment can be implemented in combination with any of other embodiments.

(Embodiment 4)

In this embodiment, an application example of the electrode of the energy storage device having a high discharge capacity described in Embodiment 1 will be described with reference to FIG. 5.

Figure 5:
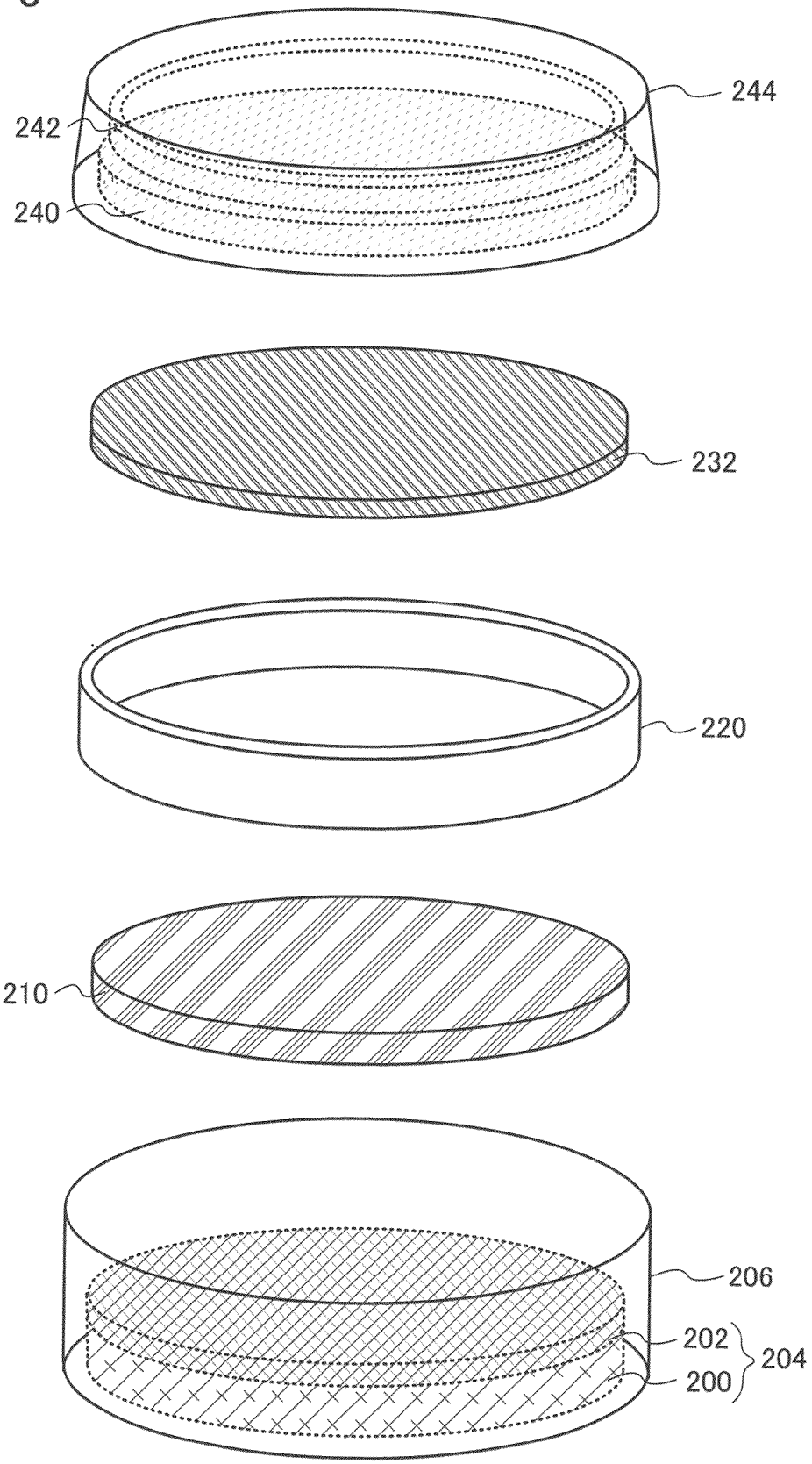
FIG. 5 is an example of a method for manufacturing a secondary battery.

FIG. 5 shows the structure of a coin-type secondary battery. As illustrated in FIG. 5, the coin-type secondary battery includes a negative electrode 204, a positive electrode 232, a separator 210, an electrolyte (not illustrated), a housing 206, and a housing 244. Besides, the coin-type secondary battery includes a ring-shaped insulator 220, a spacer 240, and a washer 242.

The electrolyte in which $LiPF_6$ is dissolved in a mixed solvent of ethylene carbonate (EC) and diethyl carbonate (DEC) is preferably used; however one embodiment of the present invention is not limited hereto.

The negative electrode 204 includes a negative electrode active material layer 202 over a negative electrode current collector 200. As the negative electrode current collector 200, copper is used, for example. Further, the current collectors 101 and 111 described in Embodiment 1 can be used. As a negative electrode active material, graphite, polyacene, or the like is used. The negative electrode active material layer 202 is preferably formed using such a material alone or a mixture of the material and a binder. Alternatively, the negative electrode active material layer 202 can be formed using the active material layer 103 which is formed using the crystalline silicon layer described in Embodiment 1.

An insulator with pores (e.g., polypropylene) may be used for the separator 210. Alternatively, a solid electrolyte which can transmit lithium ions may be used.

The housing 206, the housing 244, the spacer 240, and the washer 242 each of which is made of metal (e.g., stainless steel) are preferably used. The housing 206 and the housing 244 have a function of electrically connecting the negative electrode 204 and the positive electrode 232 to the outside.

The negative electrode 204, the positive electrode 232, and the separator 210 were soaked in the electrolyte. Then, as illustrated in FIG. 5, the negative electrode 204 inside the housing 206, the separator 210, the ring-shaped insulator 220, the positive electrode 232, the spacer 240, the washer 242, and the housing 244 were stacked in this order. The housing 206 and the housing 244 were subjected to pressure bonding. In such a manner, the coin-type secondary battery was manufactured.

This embodiment can be implemented in combination with any of other embodiments.

(Embodiment 5)

In this embodiment, an example in which the energy storage device having a high discharge capacity according to one embodiment of the present invention is used in a secondary battery of a wireless power feeding system (hereinafter referred to as an RF power feeding system) will be described with reference to block diagrams in FIG. 6 and FIG. 7. In each of the block diagrams, independent blocks show elements within a power receiving device and a power feeding device, which are classified according to their functions. However, it may be practically difficult to completely separate the elements according to their functions; in some cases, one element can involve a plurality of functions.

First, the RF power feeding system will be described with reference to FIG. 6.

A power receiving device 600 is an electronic device or an electric propulsion vehicle which is driven by electric power supplied from a power feeding device 700, and can be applied to another device which is driven by electric power, as appropriate. Typical examples of the electronic device include cameras such as digital cameras or video cameras, digital photo frames, mobile phones (also referred to as cellular phones or cellular phone devices), portable game machines, portable information terminals, audio reproducing devices, display devices, computers, and the like. Typical examples of the electric propulsion vehicles include electric vehicles, hybrid electric vehicles, train vehicles, maintenance vehicles, carts, wheelchairs, and the like. In addition, the power feeding device 700 has a function of supplying electric power to the power receiving device 600.

Figure 6:
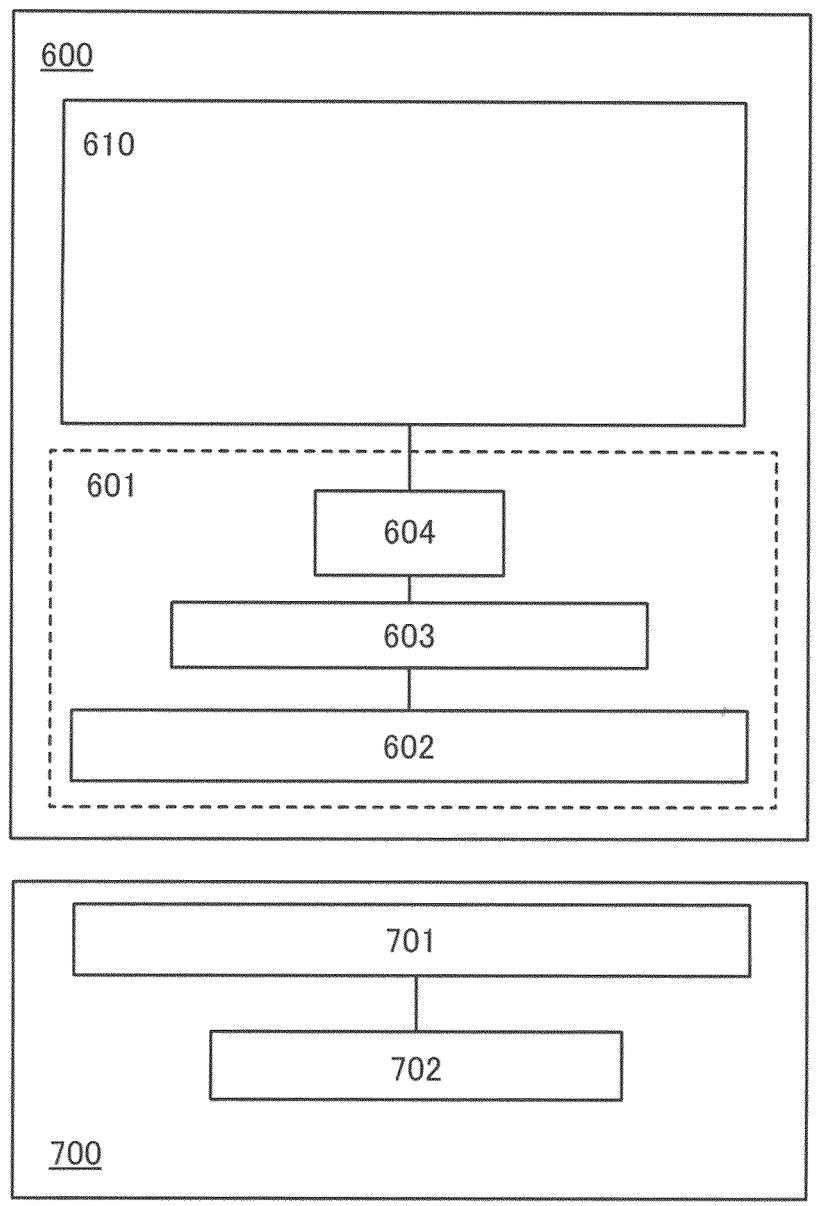
FIG. 6 is a diagram showing a configuration of a wireless power feeding system.

In FIG. 6, the power receiving device 600 includes a power receiving device portion 601 and a power load portion 610. The power receiving device portion 601 includes at least a power receiving device antenna circuit 602, a signal processing circuit 603, and a secondary battery 604. The power feeding device 700 includes at least a power feeding device antenna circuit 701 and a signal processing circuit 702.

The power receiving device antenna circuit 602 has a function of receiving a signal transmitted by the power feeding device antenna circuit 701 or transmitting a signal to the power feeding device antenna circuit 701. The signal processing circuit 603 processes a signal received by the power receiving device antenna circuit 602 and controls charging of the secondary battery 604 and supplying of electric power from the secondary battery 604 to the power load portion 610. In addition, the signal processing circuit 603 controls operation of the power receiving device antenna circuit 602. That is, the signal processing circuit 603 can control the intensity, the frequency, or the like of a signal transmitted by the power receiving device antenna circuit 602. The power load portion 610 is a driving portion which receives electric power from the secondary battery 604 and drives the power receiving device 600. Typical examples of the power load portion 610 include a motor, a driving circuit, and the like. Another device which drives the power receiving device by receiving electric power can be used as the power load portion 610 as appropriate. The power feeding device antenna circuit 701 has a function of transmitting a signal to the power receiving device antenna circuit 602 or receiving a signal from the power receiving device antenna circuit 602. The signal processing circuit 702 processes a signal received by the power feeding device antenna circuit 701. In addition, the signal processing circuit 702 controls operation of the power feeding device antenna circuit 701. That is, the signal processing circuit 702 can control the intensity, the frequency, or the like of a signal transmitted by the power feeding device antenna circuit 701.

The secondary battery according to one embodiment of the present invention is used as the secondary battery 604 included in the power receiving device 600 in the RF power feeding system illustrated in FIG. 6.

With the use of the secondary battery according to one embodiment of the present invention in the RF power feeding system, the amount of energy storage can be larger than that in a conventional energy storage device. Therefore, the time interval of the wireless power feeding can be longer (frequent power feeding can be omitted).

In addition, with the use of the secondary battery according to one embodiment of the present invention in the RF power feeding system, the power receiving device 600 can be formed to be compact and lightweight if the amount of energy storage with which the power load portion 610 can be driven is the same as that in a conventional energy storage device. Therefore, the total cost can be reduced.

Next, another example of the RF power feeding system will be described with reference to FIG. 7.

Figure 7:
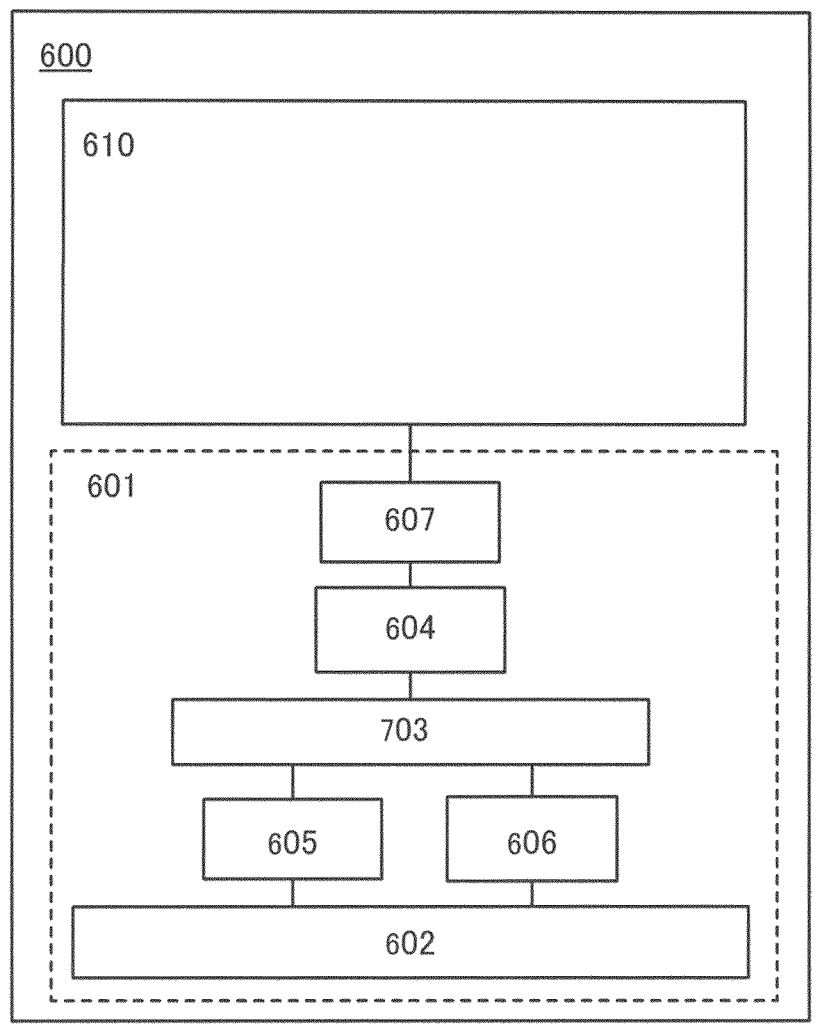
FIG. 7 is diagram showing a configuration of a wireless power feeding system.
Figure 7:
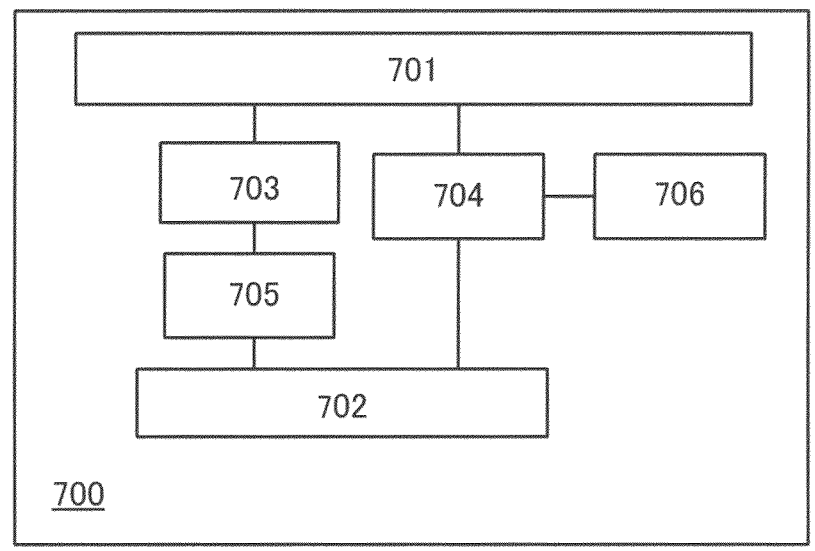

In FIG. 7, the power receiving device 600 includes the power receiving device portion 601 and the power load portion 610. The power receiving device portion 601 includes at least the power receiving device antenna circuit 602, the signal processing circuit 603, the secondary battery 604, a rectifier circuit 605, a modulation circuit 606, and a power supply circuit 607. In addition, the power feeding device 700 includes at least the power feeding device antenna circuit 701, the signal processing circuit 702, a rectifier circuit 703, a modulation circuit 704, a demodulation circuit 705, and an oscillator circuit 706.

The power receiving device antenna circuit 602 has a function of receiving a signal transmitted by the power feeding device antenna circuit 701 or transmitting a signal to the power feeding device antenna circuit 701. When the power receiving device antenna circuit 602 receives a signal transmitted by the power feeding device antenna circuit 701, the rectifier circuit 605 has a function of generating DC voltage from the signal received by the power receiving device antenna circuit 602. The signal processing circuit 603 has a function of processing a signal received by the power receiving device antenna circuit 602 and controlling charging of the secondary battery 604 and supplying of electric power from the secondary battery 604 to the power supply circuit 607. The power supply circuit 607 has a function of converting voltage stored by the secondary battery 604 into voltage needed for the power load portion 610. The modulation circuit 606 is used when a certain response signal is transmitted from the power receiving device 600 to the power feeding device 700.

With the power supply circuit 607, electric power supplied to the power load portion 610 can be controlled. Thus, overvoltage application to the power load portion 610 can be suppressed, and deterioration or breakdown of the power receiving device 600 can be reduced.

In addition, with the modulation circuit 606, a signal can be transmitted from the power receiving device 600 to the power feeding device 700. Therefore, when the amount of charged power in the power receiving device 600 is judged and a certain amount of power is charged, a signal is transmitted from the power receiving device 600 to the power feeding device 700 so that power feeding from the power feeding device 700 to the power receiving device 600 can be stopped. As a result, the secondary battery 604 is not fully charged, so that the number of charge times of the secondary battery 604 can be increased.

The power feeding device antenna circuit 701 has a function of transmitting a signal to the power receiving device antenna circuit 602 or receiving a signal from the power receiving device antenna circuit 602. When a signal is transmitted to the power receiving device antenna circuit 602, the signal processing circuit 702 generates a signal which is transmitted to the power receiving device 600. The oscillator circuit 706 generates a signal with a constant frequency. The modulation circuit 704 has a function of applying voltage to the power feeding device antenna circuit 701 in accordance with the signal generated by the signal processing circuit 702 and the signal with a constant frequency generated by the oscillator circuit 706. Thus, a signal is output from the power feeding device antenna circuit 701. On the other hand, when a signal from the power receiving device antenna circuit 602 is received, the rectifier circuit 703 has a function of rectifying the received signal. From signals rectified by the rectifier circuit 703, the demodulation circuit 705 extracts a signal transmitted from the power receiving device 600 to the power feeding device 700. The signal processing circuit 702 has a function of analyzing the signal extracted by the demodulation circuit 705.

Note that any circuit may be provided between circuits as long as the RF power feeding can be performed. For example, after the power receiving device 600 receives a signal and the rectifier circuit 605 generates DC voltage, a circuit such as a DC-DC converter or regulator that is provided in a subsequent stage may generate constant voltage. Thus, overvoltage application to the inside of the power receiving device 600 can be suppressed.

A secondary battery according to one embodiment of the present invention is used as the secondary battery 604 included in the power receiving device 600 in the RF power feeding system illustrated in FIG. 7.

With the use of the secondary battery according to one embodiment of the present invention in the RF power feeding system, the amount of energy storage can be larger than that in a conventional secondary battery. Therefore, the time interval of the wireless power feeding can be longer (frequent power feeding can be omitted).

In addition, with the use of the secondary battery according to one embodiment of the present invention in the RF power feeding system, the power receiving device 600 can be formed to be compact and lightweight if the amount of power storage with which the power load portion 610 can be driven is the same as that in a conventional secondary battery. Therefore, the total cost can be reduced.

Note that when the secondary battery according to one embodiment of the present invention is used in the RF power feeding system and the power receiving device antenna circuit 602 and the secondary battery 604 are overlapped with each other, it is preferable that the impedance of the power receiving device antenna circuit 602 is not changed by deformation of the secondary battery 604 due to charge and discharge of the secondary battery 604 and deformation of an antenna due to the above deformation. When the impedance of the antenna is changed, in some cases, electric power is not supplied sufficiently. For example, the secondary battery 604 may be placed in a battery pack formed using metal or ceramics. Note that in that case, the power receiving device antenna circuit 602 and the battery pack are preferably separated from each other by several tens of micrometers or more.

Further, the charging signal has no limitation on its frequency and may have any band of frequency as long as electric power can be transmitted. For example, the charging signal may have any of an LF band of 135 kHz (long wave), an HF band of 13.56 MHz, a UHF band of 900 MHz to 1 GHz, and a microwave band of 2.45 GHz.

A signal transmission method may be properly selected from various methods including an electromagnetic coupling method, an electromagnetic induction method, a resonance method, and a microwave method. In order to prevent energy loss due to foreign substances containing moisture, such as rain and mud, the electromagnetic induction method or the resonance method using a low frequency band, specifically, very-low frequencies of 3 kHz to 30 kHz, low frequencies of 30 kHz to 300 kHz, medium frequencies of 300 kHz to 3 MHz, or high frequencies of 3 MHz to 30 MHz is preferably used.

This embodiment can be implemented in combination with any of other embodiments.

This application is based on Japanese Patent Application serial no. 2010-123260 filed with Japan Patent Office on May 28, 2010, the entire contents of which are hereby incorporated by reference.

What is claimed is:

1. A method for manufacturing an energy storage device comprising:
dispersing a metal element over a current collector; and
performing low pressure chemical vapor deposition to form a silicon layer, using a deposition gas containing silicon as a source gas so that silicon in the silicon layer is diffused and a mixed layer comprising the metal element and silicon is formed between the current collector and the silicon layer,
wherein the silicon layer includes a plurality of whiskers and is continuous over the current collector,
wherein long-side directions of the plurality of whiskers are random, and
wherein the metal element is an element which is capable of forming silicide.

2. The method for manufacturing an energy storage device according to claim 1, wherein the low pressure chemical vapor deposition is performed at a temperature which is higher than 580° C.

3. The method for manufacturing an energy storage device according to claim 1, wherein silicon hydride, silicon fluoride, or silicon chloride is used as the deposition gas containing silicon.

4. The method for manufacturing an energy storage device according to claim 1, wherein the current collector has a foil shape, a plate shape, or a net shape.

5. The method for manufacturing an energy storage device according to claim 1, wherein the current collector is formed over a substrate by sputtering or chemical vapor deposition.

6. The method for manufacturing an energy storage device according to claim 1, wherein dispersion of the metal element is performed by application of a chemical solution containing the metal element at 1000 ppm or more.

7. The method for manufacturing an energy storage device according to claim 1, wherein the metal element is one or more selected from zirconium, titanium, hafnium, vanadium, niobium, tantalum, chromium, molybdenum, tungsten, cobalt, and nickel.

8. The method for manufacturing an energy storage device according to claim 1, wherein the silicon layer is a crystalline silicon layer.

9. A method for manufacturing an energy storage device comprising:
dispersing a metal element over a current collector; and
forming a silicon layer including a plurality of whiskers by low pressure chemical vapor deposition, using a deposition gas containing silicon as a source gas,
wherein silicon in the silicon layer is diffused by heating during forming the silicon layer so that a mixed layer comprising the metal element and silicon is formed between the current collector and the silicon layer,
wherein the silicon layer is continuous over the current collector,
wherein long-side directions of the plurality of whiskers are random, and
wherein the metal element is an element which is capable of forming silicide.

10. The method for manufacturing an energy storage device according to claim 9, wherein the silicon layer is a crystalline silicon layer.

11. The method for manufacturing an energy storage device according to claim 9, wherein the metal element is one or more selected from zirconium, titanium, hafnium, vanadium, niobium, tantalum, chromium, molybdenum, tungsten, cobalt, and nickel.

12. A method for manufacturing an energy storage device comprising:
dispersing a metal element over a current collector by a spin coating; and performing low pressure chemical vapor deposition to form a silicon layer, using a deposition gas containing silicon as a source gas so that silicon in the silicon layer is diffused and a mixed layer comprising the metal element and silicon is formed between the current collector and the silicon layer, wherein the silicon layer includes a plurality of whiskers and is continuous over the current collector, wherein long-side directions of the plurality of whiskers are random. and wherein the metal element is an element which is capable of forming silicide.

13. The method for manufacturing an energy storage device according to claim 12, wherein the silicon layer is a crystalline silicon layer.

14. The method for manufacturing an energy storage device according to claim 12, wherein the metal element is one or more selected from zirconium, titanium, hafnium, vanadium, niobium, tantalum, chromium, molybdenum, tungsten, cobalt, and nickel.

* * * * *